April 15, 1958   H. T. GOODENBERGER   2,830,388
FEATURE DEMONSTRATING DEVICE
Filed Aug. 20, 1954
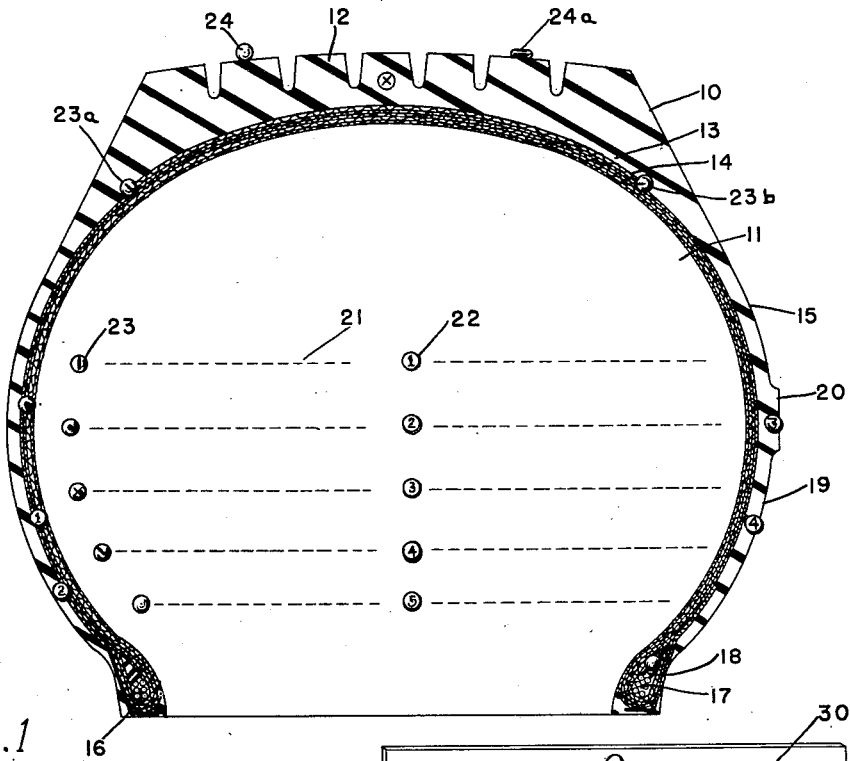
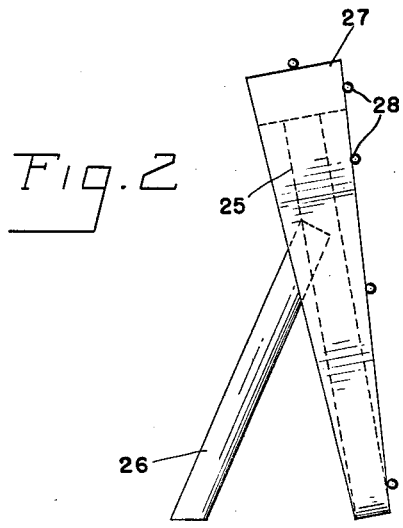
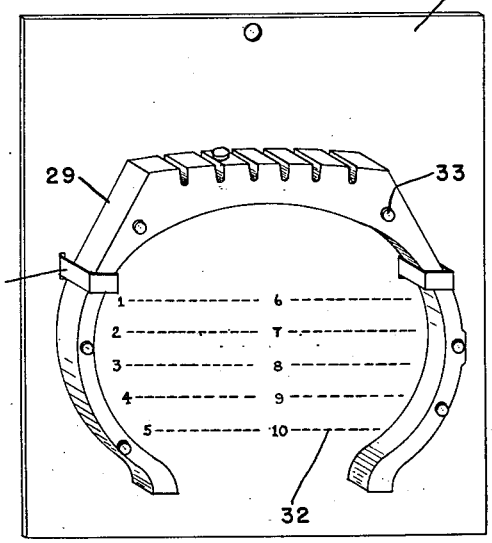
INVENTOR.
HARRY T. GOODENBERGER
BY
ATT'Y.

United States Patent Office 2,830,388
Patented Apr. 15, 1958

2,830,388
FEATURE DEMONSTRATING DEVICE

Harry T. Goodenberger, Dayton, Ohio, assignor to The Dayton Rubber Company, a corporation of Ohio Application August 20, 1954, Serial No. 451,110

4 Claims. (Cl. 35—49)

The present invention relates to a demonstration or educational device, particularly to such a device for use in the merchandising of items of complicated or obscure structure. The present invention is particularly adapted for use in the demonstration of the features of a pneumatic tire such as is commonly employed in the transportation field.

In the course of a demonstration or an educational program designed to acquaint one with the specific features of a designated item, it is, of course, desirable to employ a specimen or model of such item in order that the demonstration may be accompanied by visual illustration. In the particular case of a sales demonstration of a pneumatic rubber tire, it would, of course, be desirable to refer in visible fashion to the actual structural components thereof. However, because of the close association of the respective components of a pneumatic tire and their obscurity as a result of their being more or less completely surrounded by and engulfed in a rubber or rubber-like composition forming the main part of the body of the tire, a clear and well-defined reference to any particular component is rendered difficult.

To avoid such difficulties, it has been the procedure in the past to rely upon enlarged drawings or photographs, enlarged or cutaway models, or skeleton structures which leave out one or more of the several tire components for the purpose of making the remaining ones more clearly visible and understandable. Notwithstanding the recognized merit of these foregoing expedients, all of the same have lacked in the important feature that the expansion or enlargement and cutting away have subtracted from the realism of the demonstration insofar as such realism would exist if an actual tire or tire cross section could be employed.

It is accordingly an object of the present invention to provide an educational demonstration device capable of creating a realistic association in the mind of the viewer.

It is a more specific object of the present invention to provide a demonstration device for clearly designating the structural components of a pneumatic tire body notwithstanding the obscurity of the location and bounds of these components.

It is a further object of the present invention to provide such a demonstration device capable of application to an actual tire body section.

To achieve these and other objects and advantages of the present invention to be apparent from a reading of the following disclosure, it is provided herein that cooperative sets of corresponding indicia be employed together with separate divisions of descriptive matter such that the respective sets of the corresponding indicia will correlate a particular component with its division of descriptive matter.

The nature of the marking indicia, and particularly those to be affixed directly to the tire body section is such that, notwithstanding the close contiguity of the respective components of the tire, their limits and confines may be clearly pinpointed. A means which has been found to be particularly satisfactory for so limiting and defining the specific components has involved a set of marking indicia carried by individual pins or tacks having a head capable of carrying the marking symbol but not being so large as to obscure the size, shape or function of the tire component which it designates. These pins have special application to the present invention in that they may be readily inserted into the general rubbery mass by which all pneumatic tire bodies are characterized.

Also enhancing the realistic effect of a demonstration employing the device of this invention and cooperating with the clear illustration of the structural components of the tire is a mounting means for supporting a tire section in a position similar to that which it would assume if inflated and placed under operating loads. In addition to thus supporting the tire section, the mounting means provide a desirable media for the above-mentioned descriptive material and symbols correlating this material with the tire components.

For a description of a preferred embodiment of this invention reference may be had to the following detailed description in connection with which reference may be had to the appended drawings.

In the drawings:

Figure 1 is a view in elevation of a device according to this invention. While the tire section forming the peripheral portion of this drawing is shown in cross section, it is to be understood that such a cross section is actually employed in the device so that the structural components of the tire will be readily apparent to the observer.

Figure 2 is an end elevation of the device of Figure 1 as it may be employed in the form of a counter display device upon a stand.

Figure 3 is a perspective of a modification of the device of this invention.

Referring now to Figures 1 and 2, a cross-sectional segment 10 from a typical pneumatic tire is positioned about the outer periphery of a mounting spacer block 11, the outer contour of which conforms to the inner contour of a pneumatic tire casing under actual conditions of inflation and loading. The tire section 10 comprises a peripheral rubber tread portion 12, an undertread 13 of rubber-like composition, a rubberized fabric breaker 14 and an inner carcass portion 15 of superimposed layers of rubberized fabric. This carcass portion lines the entire inner periphery of the tire casing and terminates in the bead portion 16, such portion comprising a stranded wire cable or cables 17 surrounded by the terminal portion of the fabric layers forming the carcass 15 and held in place by a flipper 18 of a rubber-like substance. The outer covering of the tire casing includes in addition to the tread portion 12, the sidewalls 19, the outermost of which also has a protecting rib 20. It is to be understood, of course, that the present invention is adaptable to any form of tire cross section incorporating a wide variety of arrangements of fabric and rubber-like portions as well as additional reinforcing features such as chafer strips, all of which are well known to the art.

The mounting or spacing member 11 may be composed of a rigid material such as wood or metal, the former being perhaps more desirable insofar as it is of lighter weight and is more amenable to a satisfactory finish upon which printing or the like may be made. As explained above, this spacer should be shaped to conform to the inner periphery of a tire as it is under operative loads and to be of a thickness sufficient to provide support for whatever width of tire section is employed. In one preferred embodiment, for example, the tire section segment itself might be approximately one inch in width while the mounting or spacer member 11 is only slightly thinner, being approximately ¾ in. in thickness.

On the spacer member 11 may be placed the divisions 21 of descriptive material, graphic or otherwise, setting forth the pertinent information with regard to the respective important structural features of the tire section surrounding the spacer. Such information might include a brief description or definition of the component in question and its function in the tire assembly. In adjacency with each of the groupings of descriptive matter is a symbol or similar marking means 22 and 23, each having a counterpart located at some point on the tire in such a manner that the cooperative symbols will connect the descriptive matter such as 21 on the spacer with the tire component on the section.

As shown in Figure 1, the symbols employed may be numbers 22 or simply conventional markings such as lines, dots, x's and circles such as are shown at 23. In the example of Figure 1 the descriptive material opposite the dash symbol 23 might pertain to the tire breaker explaining that such a breaker is employed to cushion the tire carcass from shock loadings such as are encountered when running over large stones or into curbings and the like and that, in order to operate satisfactorily, such breaker must be composed of a flexible material having a high rupture strength, etc. In order that the person reading this descriptive material may be able to correlate the same with the structure of the tire, he may look upon the section of the tire mounted about the spacer means, and observe the marking indicia 23a carrying a similar dash mark indicating that the descriptive matter relating to the breaker is represented by the fabric strip included between the two dash marks numbered 23a and 23b. While the symbols that appear opposite the descriptive matter on the spacer member may be printed directly upon the same so as to avoid the need for a tack or pin having the mark imprinted upon its head, it is preferred that those symbols which are applied to the tire section be carried by a tack or pin 24 and 24a such that the symbol may be readily and adjustably affixed to the tire section.

The showing in Figure 2 illustrates the manner in which the device previously described may be employed as a counter display unit by simply placing a socket in the rear of the spacing member 25 to accommodate a leg or stand member 26 which may simply be a dowel pin so beveled at its ends that it will hold the demonstration device at the proper angle. This modification, like the device of Figure 1, incorporates a tire section 27 and marking pins 28.

The modification of the present invention shown in Figure 3 involves a tire casing section 29 similar to 10 of Figure 1 having the various structural components which it is desired to point out. The present modification, however, incorporates as a mounting means a simple flat backboard 30 upon which the tire section 29 is held by clips and/or tacks 31. Once again the descriptive material 32 intended to describe the particular components of the tire may be placed on the mounting backboard. In the particular instance shown this is done within the area defined by the expanded tire segment. The symbols employed in this embodiment are all numbers, the same being printed directly to the mounting member. At the same time, however, the marking indicia to be applied to the tire section will again take the preferred form of headed pins or tacks 33 which will carry the numbers corresponding to those imprinted upon the mounting board, such tacks or pins being located at those points on the tire corresponding to the descriptive material appearing on the mounting board opposite the corresponding number.

In this manner, there is provided a demonstration device which is at once capable of being easily handled by one endeavoring to demonstrate the features of a pneumatic tire and of imparting improved realism to the demonstration insofar as an actual tire cross section is employed. The pinpointing devices of this invention make it easy to clearly define and point out the structural components of importance without any sacrifice of clarity, notwithstanding the contiguity and close integration of the components as previously explained.

Although the present invention has been set forth in particular detail with regard to certain preferred embodiments thereof, it is to be understood that all particularization has been for purposes of description and illustration only and is in no way intended to limit the scope of the present invention as it is defined in the subjoined claims.

I claim:

1. A tire construction demonstration device comprising a section of a tire body, mounting means for supporting said section, symbol-carrying pins inserted in the tire body at the various structural components thereof, a second corresponding set of symbol-carrying pins inserted in spaced relationship into the mounting means and descriptive matter adjacent to and identifiable with each of said second set of pins whereby said descriptive matter is related to the structural components of the tire body section.

2. A tire demonstrating device according to claim 1 wherein said symbols are numbers.

3. A demonstrator device comprising a cross section of a tire body, mounting means for supporting said section comprising a spacer member conforming in shape to the cross section of the tire body as it would appear when the tire is inflated, such means supporting the inner periphery of said section, marking indicia inserted in various structural components of the tire body section, divisions of graphic matter on said mounting means separately describing the structural components designated by said indicia and symbols adjacent said divisions of graphic matter which correspond to said marking indicia and relate said descriptive matter to said structural components.

4. A demonstrator device comprising a cross section of a tire body, mounting means comprising a backboard and clips passing therethrough and supporting said section, marking indicia inserted in various structural components of the tire body section, divisions of graphic matter on said mounting means separately describing the structural components designated by said indicia and symbols adjacent said divisions of graphic matter which correspond to said marking indicia and relate said descriptive matter to said structural components.

References Cited in the file of this patent

UNITED STATES PATENTS

| | | |
|---|---|---|
| 2,159,925 | Wood | May 23, 1939 |
| 2,312,532 | Engstrom | Mar. 2, 1943 |
| 2,505,279 | Dehaime | Apr. 25, 1950 |
| 2,632,268 | Schroeder | Mar. 24, 1953 |

FOREIGN PATENTS

| | | |
|---|---|---|
| 351,350 | Great Britain | June 25, 1931 |